US010963556B2

(12) United States Patent
Dick et al.

(10) Patent No.: US 10,963,556 B2
(45) Date of Patent: *Mar. 30, 2021

(54) AUTOMATED PASSWORD AUTHENTICATION

(71) Applicant: INTERNATIONAL BUSINESS MACHINES CORPORATION, Armonk, NY (US)

(72) Inventors: Adrian David Dick, Southampton (GB); James Stuart Taylor, Fareham (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/441,702

(22) Filed: Jun. 14, 2019

(65) Prior Publication Data
US 2019/0325128 A1 Oct. 24, 2019

Related U.S. Application Data

(63) Continuation of application No. 15/937,156, filed on Mar. 27, 2018, now Pat. No. 10,395,023, which is a continuation of application No. 14/959,871, filed on Dec. 4, 2015, now Pat. No. 9,959,401, which is a continuation of application No. 13/449,155, filed on Apr. 17, 2012, now Pat. No. 9,246,685, which is a continuation of application No. 12/201,108, filed on Aug. 29, 2008, now Pat. No. 8,234,502.

(51) Int. Cl.
*G06F 21/36* (2013.01)
*G06F 21/31* (2013.01)
*H04L 29/06* (2006.01)
*H04L 9/32* (2006.01)
*G06F 21/45* (2013.01)

(52) U.S. Cl.
CPC .............. *G06F 21/36* (2013.01); *G06F 21/31* (2013.01); *G06F 21/45* (2013.01); *H04L 9/3228* (2013.01); *H04L 9/3271* (2013.01); *H04L 63/08* (2013.01); *H04L 63/083* (2013.01)

(58) Field of Classification Search
CPC ....... H04L 63/08; H04L 63/083; G06F 21/36; G06F 21/45; G06F 21/31
USPC ........................................................ 726/18
See application file for complete search history.

(56) References Cited

U.S. PATENT DOCUMENTS 5,282,247 A   1/1994   McLean et al.
5,680,617 A   10/1997  Gough et al.
5,999,525 A   12/1999  Krishnaswamy et al.
(Continued)

*Primary Examiner* — Tae K Kim
*Assistant Examiner* — Peiliang Pan
(74) *Attorney, Agent, or Firm* — Christopher Pignato; Andrew M. Calderon; Roberts Calderon Safran & Cole, P.C.

(57) ABSTRACT

A system connected to an existing computer includes a unit for monitoring the screen and provides input, a storage unit that stores data that pairs screen buffer regions with authentication details, wherein the system learns new pairs via user training and presents stored authentication details when the screen buffer regions match a related stored region which is paired with a region of the screen, and a unit that determines which of stored passwords need to be presented to the system by a pattern matching of regions of screen pixels.

20 Claims, 5 Drawing Sheets

(56) References Cited

U.S. PATENT DOCUMENTS

| | | | |
|---|---|---|---|
| 6,219,047 B1 * | 4/2001 | Bell | G06F 9/453 715/705 |
| 6,314,425 B1 | 11/2001 | Serbinis et al. | |
| 6,405,362 B1 | 6/2002 | Shih et al. | |
| 6,587,836 B1 | 7/2003 | Ahlberg et al. | |
| 7,171,384 B1 | 1/2007 | Fitzpatrick et al. | |
| 7,216,007 B2 | 5/2007 | Johnson | |
| 7,233,997 B1 * | 6/2007 | Leveridge | G06F 21/33 709/217 |
| 7,243,239 B2 | 7/2007 | Kirovski et al. | |
| 7,376,907 B2 | 5/2008 | Santoro et al. | |
| 7,380,120 B1 | 5/2008 | Garcia | |
| 7,394,486 B2 | 7/2008 | Nakami | |
| 7,454,783 B2 * | 11/2008 | Dupouy | G06F 21/34 703/22 |
| 7,639,943 B1 | 12/2009 | Kalajan | |
| 7,685,430 B1 * | 3/2010 | Masurkar | G06F 21/31 380/255 |
| 7,945,788 B2 | 5/2011 | Roberts et al. | |
| 7,961,917 B2 | 6/2011 | Black | |
| 8,108,914 B2 | 1/2012 | Hernoud et al. | |
| 8,397,077 B2 * | 3/2013 | Hoey | G06F 21/33 713/184 |
| 2001/0032205 A1 | 10/2001 | Kubaitis | |
| 2002/0129283 A1 * | 9/2002 | Bates | G06F 21/31 726/5 |
| 2002/0138389 A1 | 9/2002 | Martone et al. | |
| 2002/0138769 A1 | 9/2002 | Fishman et al. | |
| 2003/0069071 A1 | 4/2003 | Britt et al. | |
| 2003/0184589 A1 * | 10/2003 | Yamada | G06F 40/174 715/781 |
| 2003/0198365 A1 | 10/2003 | McWilliam et al. | |
| 2004/0107415 A1 | 6/2004 | Melamed et al. | |
| 2004/0153649 A1 | 8/2004 | Rhoads et al. | |
| 2006/0005263 A1 * | 1/2006 | Hardt | G06F 21/33 726/28 |
| 2006/0013400 A1 | 1/2006 | Sutton, II et al. | |
| 2006/0023921 A1 | 2/2006 | Saitoh et al. | |
| 2006/0030402 A1 | 2/2006 | Chandrakumar et al. | |
| 2006/0033809 A1 | 2/2006 | Farley | |
| 2006/0057550 A1 | 3/2006 | Sahashi | |
| 2006/0184410 A1 | 8/2006 | Ramamurthy et al. | |
| 2006/0271689 A1 | 11/2006 | Kikuchi | |
| 2006/0291453 A1 | 12/2006 | Kuwahara | |
| 2007/0028100 A1 | 2/2007 | Sato | |
| 2007/0124600 A1 * | 5/2007 | Huang | G06F 21/32 713/186 |
| 2007/0240055 A1 * | 10/2007 | Ting | H04L 63/1408 715/704 |
| 2007/0240230 A1 | 10/2007 | O'Connell et al. | |
| 2007/0250885 A1 | 10/2007 | Ohashi | |
| 2007/0286496 A1 | 12/2007 | Matsuzaki et al. | |
| 2008/0082813 A1 | 4/2008 | Chow et al. | |
| 2008/0244700 A1 | 10/2008 | Osborn et al. | |
| 2008/0301685 A1 | 12/2008 | Thomas et al. | |
| 2009/0019540 A1 | 1/2009 | Itsik | |
| 2009/0293119 A1 * | 11/2009 | Jonsson | G06F 21/36 726/19 |
| 2009/0307765 A1 | 12/2009 | Mardikar et al. | |
| 2010/0043062 A1 | 2/2010 | Alexander et al. | |
| 2010/0050242 A1 | 2/2010 | Delia et al. | |
| 2010/0185808 A1 * | 7/2010 | Yu | G06F 13/1684 711/103 |
| 2010/0322113 A1 * | 12/2010 | Chin | H04M 3/38 370/261 |
| 2012/0003993 A1 | 1/2012 | Leino et al. | |

* cited by examiner

100

101

102

103

104

105

200

201

202

203

AUTOMATED PASSWORD AUTHENTICATION

BACKGROUND OF THE INVENTION

The present invention generally relates to a method and system for automated password authentication, and more specifically to a method and system for automated password authentication for all websites and software, on a laptop, a desktop, or a mainframe accessed via a terminal emulator.

One of the biggest problems for a user of a desktop, a laptop, or a main frame computer is authentication. Each system requires a password matching with a different criterion. Each password may expire at a different interval and therefore at a different time. Ironically, these protection measures start to weaken the protection because users have to find a way to remember these many different passwords.

The more naive and careless users may still use paper to write the passwords down. Some of the savvier users might use a software-based password vault, protecting all their passwords with a sign-on to the password vault. People start to resort to easily deduced passwords, even though they fit the security pattern. Examples are consecutive keys on a keyboard or a word on a poster/wall (e.g., in one call center many users had been using a heading of a billboard outside their office window).

Regardless of how well people deal with the situation, there will be few people who have not found this situation annoying, while using a computer.

SUMMARY OF THE INVENTION

In view of the foregoing and other exemplary problems, drawbacks, and disadvantages of the conventional methods and structures, an exemplary feature of the present invention is to provide a method for automated password authentication.

Inventions already exist to store passwords in a vault, protected by a single password. However, a need exists to capture a password and a user-id in the first place, and then to use this information in future logins. An exemplary purpose of this invention is to automate log-in processes without the interface requesting authentication being aware. Further, the user needs to take no action for this automated authentication to take place.

In an exemplary embodiment of the present invention, the invention software recognizes a user as the person at the machine and automatically and seamlessly logs into any authentication request that is presented to it for which the user has an account. The software uses authentication information (i.e., user-id and password), which are not stored on the machine. New authentications will be easily added with minimal configuration.

In sum, implementation of the system and method of the present invention ensures the following benefits:

No more remembering passwords;
Authentication is stronger because no one sees the user typing anything;
Authentication is stronger because passwords do not need to be human-memorable;
Systems and websites that the user is authenticating with do not need to be aware of the invention software (i.e., totally backwards compatible);
Passwords are not stored anywhere on the computer; itself, and therefore less at risk from identity theft;
Passwords are not stored on the computer, and therefore the user can use them on any computer; and
Personal and business passwords are separated, and therefore one does not weaken the other.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 1:
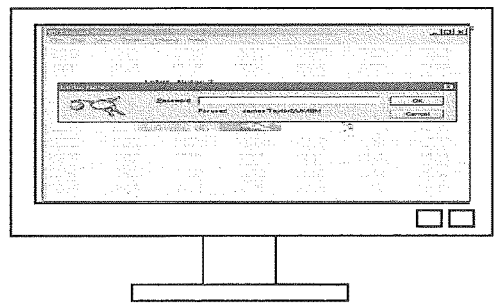
FIG. 1 illustrates an overview of a system 100 for learning a new user name and password according to an exemplary aspect of the present invention.
Figure 1:
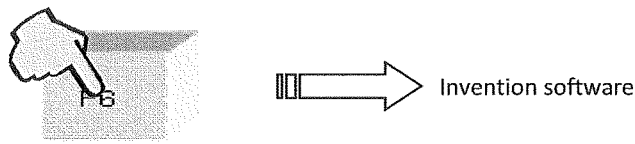
Figure 1:
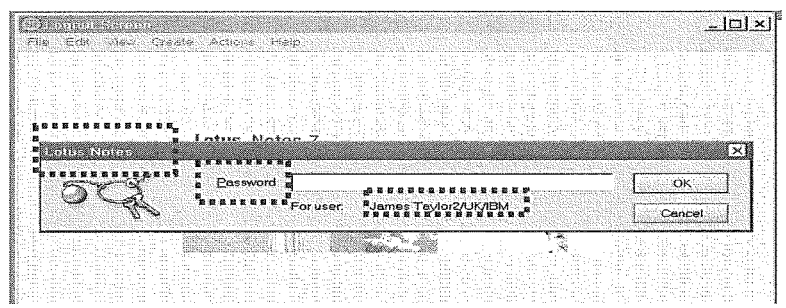
Figure 1:
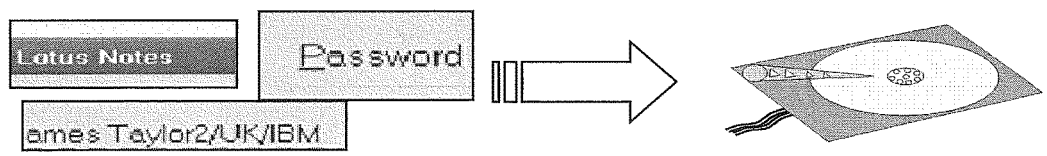
Figure 1:
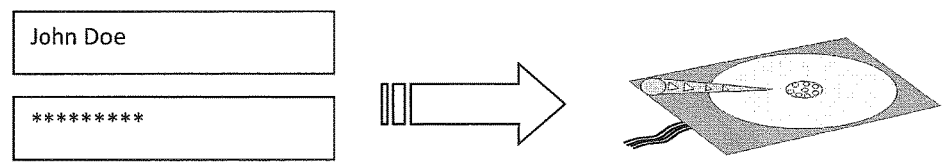

Referring now to the drawings, and more particularly to FIGS. 1-5, there are shown exemplary embodiments of the system and method according to the present invention.

FIG. 1 illustrates an exemplary embodiment of a system 100 for learning a new user name and password based on the present invention. In the system, a computer displays an authentication request (e.g., to a piece of software, a website, a remote system, etc.) (101). Then, a user gestures to a software that the system has asked for authentication (e.g., by pressing a predefined key) (102). The software asks the user to draw one or more rectangles on the screen to define pixels that show the computer is asking for a password (103). The user draws rectangles which are stored to a disk for pattern matching later (104). Finally, the software enters keystroke recording mode, and the user enters a user name and a password, which are captured by the software (105).

Figure 2:
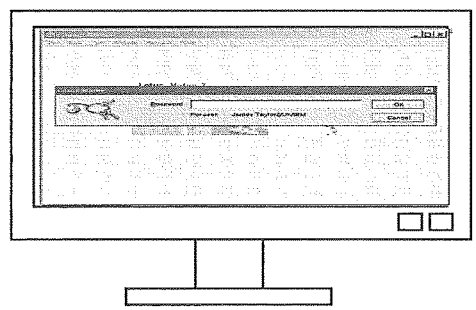
FIG. 2 illustrates a system 200 for automatically entering a username and a password when a screen is encountered according to an exemplary aspect of the present invention.
Figure 2:
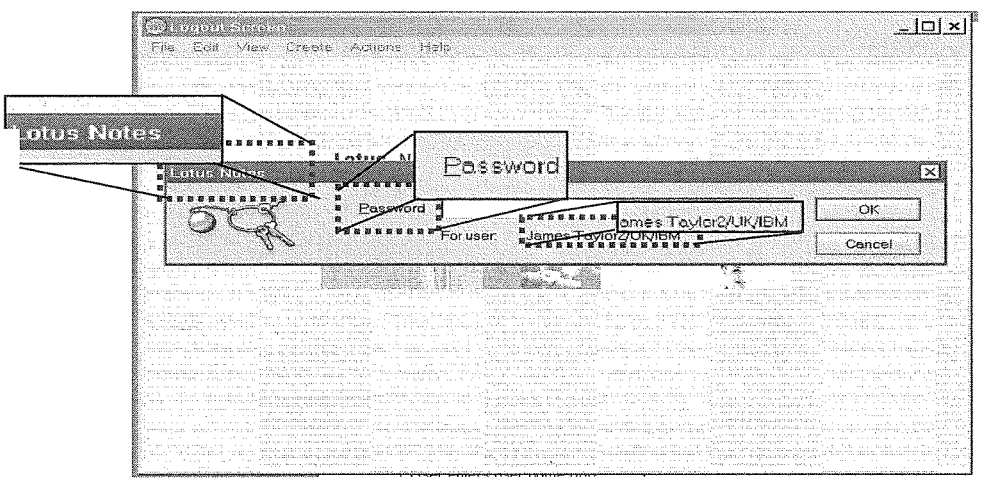
Figure 2:
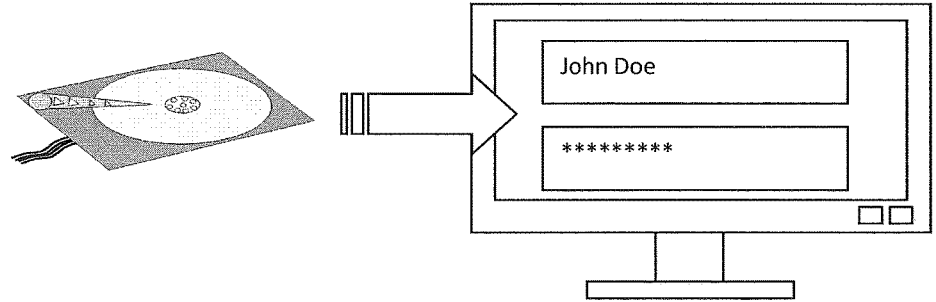

FIG. 2 illustrates an exemplary aspect of the present invention of a system 200 for automatically entering a username and a password when a screen is encountered. In the system, a computer displays authentication request (e.g., to a piece of software, a website, a remote system etc.) (201). Then, a software pattern matches and recognizes pieces of the screen bound by rectangles at time of learning (202). The system recognizes that a username and a password, recorded previously, need to be entered. Finally, the software automatically submits the username and password to the system (203).

Figure 3:
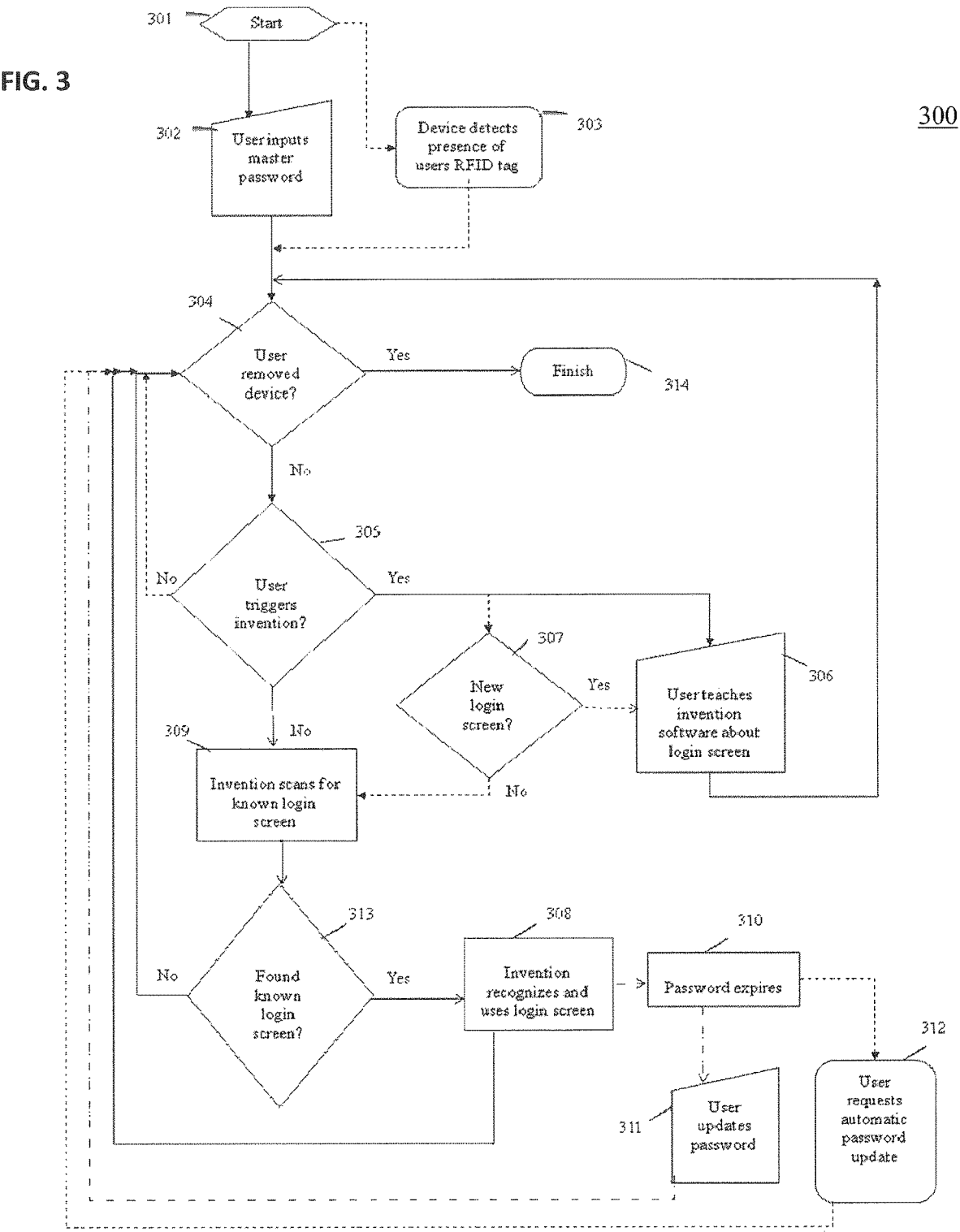
FIG. 3 illustrates a flow chart 300 of a method for automated password authentication according to an exemplary aspect of the present invention.

FIG. 3 depicts a flow chart 300 of a method for automated password authentication according to an exemplary aspect of the present invention. As exemplary purpose of implementing the method is to trigger a sequence of one or more events, based on pattern matching of a signature matrix from a screen buffer with a matrix recorded at an earlier date.

The method 300 performs the automated password authentication by pattern matching regions of screen pixels against a repository of previously captured regions. When the screen regions match an existing region-set in the repository, a username and a password stored with those regions in the repository are submitted for authentication.

The repository data includes bit map regions and associated user names and passwords that are from previous training by the user.

In step 301, a user inserts an article (e.g., a memory stick), containing an autorunnable application (the invention software), which triggers the software to startup. In step 302, the software challenges the user for a master password to access an encrypted database held on the memory stick.

Step 303 is an alternative flow to step 302, in which the memory stick is able to detect a radio frequency identification (RFID) device carried by the user which acts as an authorization token when the user is within a certain range of the memory stick.

In step 304, following a successful authorization of the user, the invention software runs as a background task. It checks if the user has removed the memory stick device. If it has, then the invention software is triggered to terminate in step 314, otherwise it moves onto step 305.

In step 305, the invention software checks if it has been triggered by the user, using a pre-defined key sequence or clicking an icon on the screen to notify the invention software that the user is about to enter a new password. If so, then the invention software moves to step 306, otherwise it moves onto step 309.

In step 306, the invention software prompts the user to highlight one or more rectangles around a text or an image which uniquely identifies a login panel (screen), and then captures the username and password as they are entered by the user. Once complete, the user continues with his work and the invention software returns to a background task in step 304.

In step 309, the invention software monitors the screen buffer looking for a matching signature based on the rectangles previously drawn by the user in step 306.

In step 313, the invention software checks if it has successfully found a matching signature in the screen buffer. If it has, then the invention software moves onto step 308, otherwise it returns to step 304.

In step 308, the invention software automatically enters the username and password. Typically, the user will continue working and the invention software returns to a background task in step 304.

Step 307 shows an alternative flow to step 305 when the processing required to constantly monitor the screen buffer is considered unacceptable. If the user has not triggered the invention software in step 305, using a pre-defined key sequence, then the invention software returns to step 304, bypassing the computationally expensive task 309. Otherwise, in this alternative flow, the invention software moves to step 307.

In step 307, the invention software detects if the user has triggered the invention software with the pre-defined key sequence to indicate a new login screen. If so, then the invention software moves to step 306, otherwise it moves to step 309.

Occasionally, following step 308, the user can be prompted that the password has expired, as shown in step 310.

In that case, in step 311, the user triggers the invention software by a pre-defined key sequence that the password just used is to be changed. As the user enters the new password, the invention software updates its record. Once complete, the user can continue working while the invention software returns to a background task in step 304.

Step 312 is an alternative to step 311, in which the user triggers the invention software by a predefined key sequence informing it that the password has expired and allowing the invention software to generate a new password for the login panel on behalf of the user. Once complete, the user can continue working, while the invention software returns to a background task in step 304.

Finally, when the user wants to finish with the computer, the user removes the memory stick in step 304, on which all the usernames, passwords, and unique signatures are stored. This triggers the software to terminate in step 314.

Figure 4:
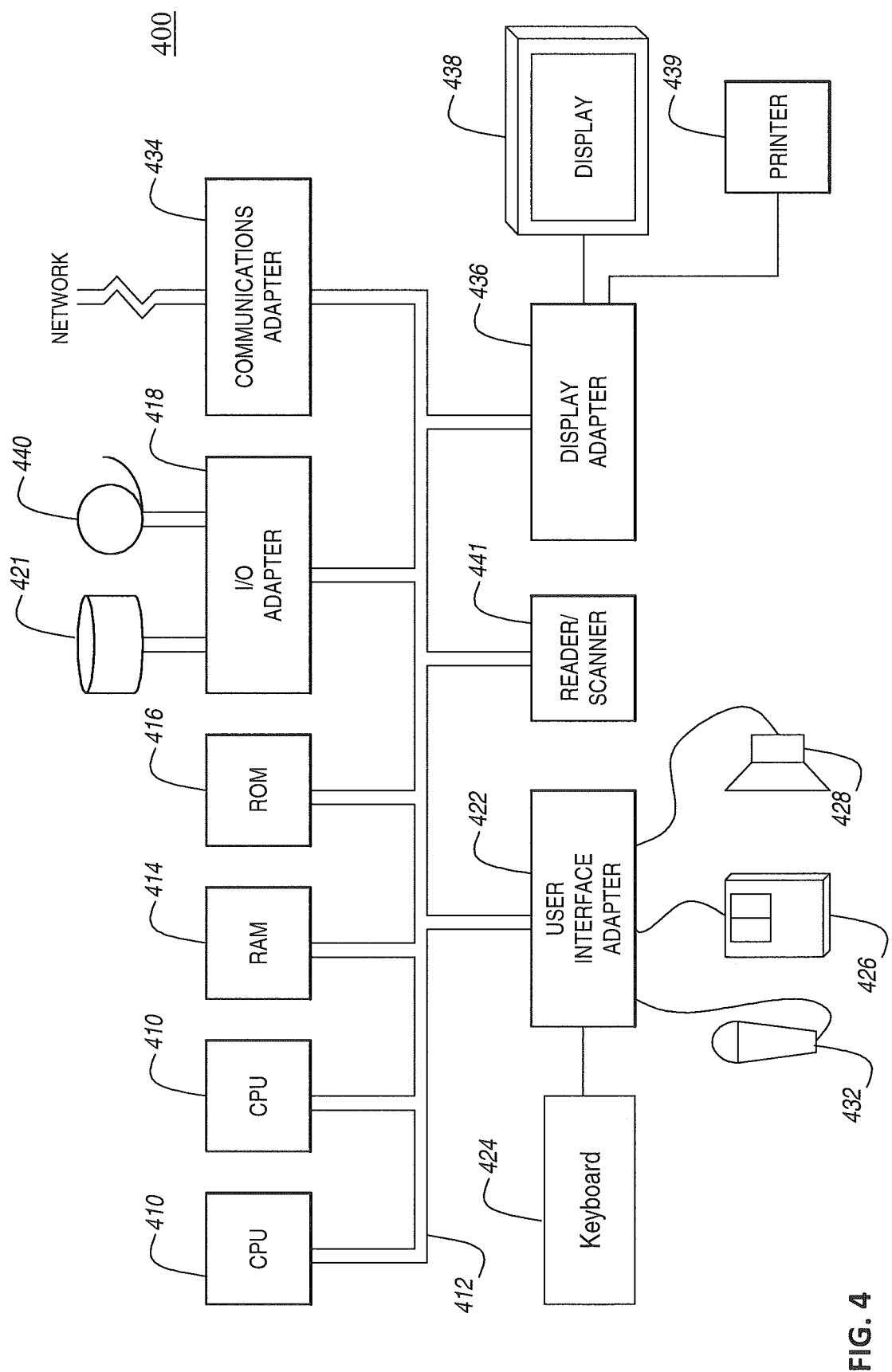
FIG. 4 illustrates an exemplary hardware/information handling system 400 for incorporating the present invention therein.

FIG. 4 illustrates a typical hardware configuration of an information handling/computer system for use with the invention and which preferably has at least one processor or central processing unit (CPU) 411.

The CPUs 411 are interconnected via a system bus 412 to a random access memory (RAM) 414, read only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting an information handling system to a data processing network, the Internet, an Intranet, a personal area network (PAN), etc., reader/scanner 441, and a display adapter 436 for connecting the bus 412 to a display device 438 and/or printer 440.

In addition to the hardware/software environment described above, a different aspect of the invention includes a computer implemented method for performing the above-described method. As an example, this method may be implemented in the particular environment discussed above.

Such a method may be implemented, for example, by operating a computer, as embodied by a digital data processing apparatus, to execute a sequence of machine readable instructions. These instructions may reside in various types of signal bearing storage media.

This signal bearing storage media may include, for example, a RAM contained within the CPU 411, as represented by the fast access storage for example. Alternatively, the instructions may be contained in another signal bearing media, such as a magnetic data storage diskette 500 (FIG. 5), directly or indirectly accessible by the CPU 411.

Whether contained in the diskette 500, the computer/CPU 411, or elsewhere, the instructions may be stored on a variety of machine readable data storage media, such as DASD storage (e.g., a conventional "hard drive" or a RAID array), magnetic tape, electronic read only memory (e.g., ROM, EPROM, or EEPROM), an optical storage device (e.g. CD ROM, WORM, DVD, digital optical tape, etc.), paper "punch" cards. In an illustrative embodiment of the invention, the machine readable instructions may comprise software object code, compiled from a language such as "C", etc.

Figure 5:
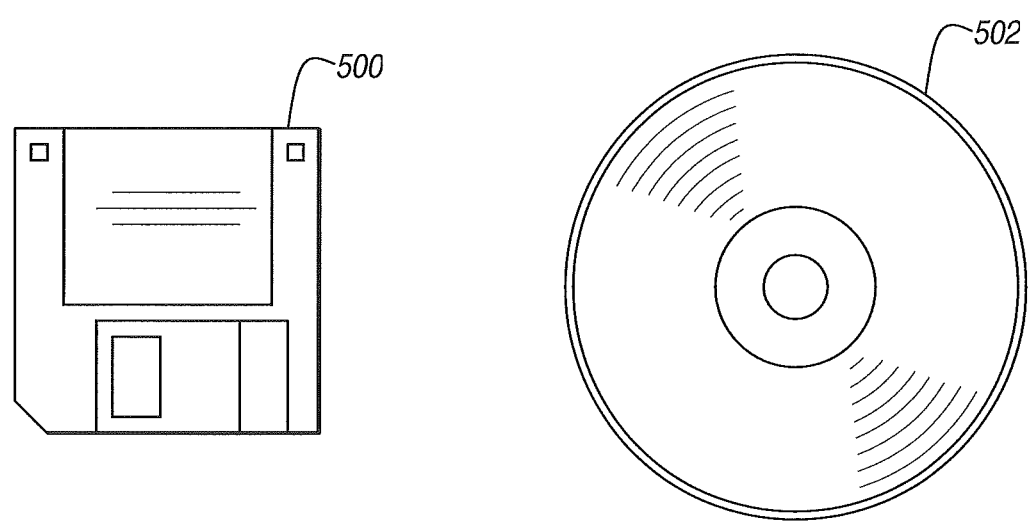
FIG. 5 illustrates a signal bearing medium 500 (e.g., storage medium) for storing steps of a program of a method according to the present invention.

FIG. 5 illustrates a signal bearing medium 500 (e.g., storage medium such as floppy disk) and CD ROM 502 for storing steps of a program of a method according to the present invention.

It should be noted that other purposes, features, and aspects of the present invention will become apparent in the entire disclosure. Modifications may be done without departing from the gist and scope of the present invention as disclosed herein and claimed as appended herewith.

In addition, it should be noted that any combination of the disclosed and/or claimed elements, matters and/or items may fall under the modifications aforementioned.

What is claimed is:

1. A computer-implemented method comprising:
monitoring an authentication request displayed on a screen and an authentication area, the authentication area providing input, wherein the authentication area encompasses a login area;
prompting the user to highlight the authentication area that identifies the login area prior to entering information into the login area;
entering a keystroke recording mode prior to entering information into the login area; and
storing data that pairs screen buffer regions with authentication details.

2. The method of claim 1, further comprising inputting a gesture indicating that the authentication request is displayed on the screen by pressing a predefined key.

3. The method of claim 2, further comprising:
outputting the authentication details in response to one of the screen buffer regions that correspond to the authentication details matching the authentication area, wherein the authentication details comprise a user name and a password; and
accessing an encrypted database on a memory circuit of the user using a master password.

4. The method of claim 3, further comprising:
comparing the authentication area with a set of stored regions; and
detecting a radio frequency identification (RFID) which is configured as an authorization token when the memory circuit is within a predetermined range of the memory circuit.

5. The method of claim 4, wherein the outputting the stored authentication details comprises presenting appropriate authentication details to simulate a manual user input after comparing the authentication area with the set of the stored regions.

6. The method of claim 5, further comprising storing a region for which the user provides login details.

7. The method of claim 1, wherein the authentication area is a rectangle.

8. The method of claim 7, wherein the authentication area is stored for later pattern matching.

9. The method of claim 8, wherein a plurality of authentication areas, which are rectangles, are provided, and regions of the screen bound by the rectangles are stored in a repository of previously captured regions.

10. The method of claim 9, wherein the regions of the screen bound by the rectangles are recognized during the pattern matching.

11. The method of claim 10, further comprising automatically outputting a previously recorded username and password into the regions of the screen bound by the rectangles based on determining which of a plurality of stored usernames and passwords are paired with the authentication area.

12. The method of claim 11, further comprising automatically submitting a username and password from a password repository upon recognition of the pattern matching of the regions of the screen, wherein the password repository includes bit map regions for the username and password.

13. The method of claim 10, wherein the pattern matching of regions of screen pixels comprises:
matching regions of screen pixels against the repository of previously captured regions of screen pixels, wherein the repository includes bit map regions from previous training by the user.

14. The method of claim 11, further comprising generating a new password for a login area in response to the user notifying that a previous one of the plurality of passwords has expired through a predefined key sequence.

15. The method of claim 14, further comprising prompting the user that the previous one of the plurality of passwords has expired.

16. The method of claim 11, prompting the user to enter a new password in response to a previous one of the plurality of passwords being expired.

17. The method of claim 16, updating the password repository with the new password in response to the user entering the new password.

18. The method of claim 1, wherein determining that the one of the stored screen buffer regions that correspond to the stored authentication details matches the authentication area is performed via pattern matching.

19. The method of claim 1, further comprising:
performing an automated password authentication by pattern matching screen pixels of the data that pairs screen buffer regions with authentication details with screen pixels of a repository of previously stored data comprising captured regions.

20. The method of claim 19, wherein the repository of previously stored data includes bitmap regions and associated user names and passwords from a previous training by a user.

* * * * *